United States Patent
Leber

(10) Patent No.: US 9,965,760 B2
(45) Date of Patent: May 8, 2018

(54) SYSTEMS AND METHODS FOR FACILITATING ELECTRONIC TRANSACTIONS UTILIZING A MOBILE COMPUTING DEVICE

(75) Inventor: Mike Leber, Fremont, CA (US)

(73) Assignee: Hurricane Electric, Fremont, CA (US)

( * ) Notice: Subject to any disclaimer, the term of this patent is extended or adjusted under 35 U.S.C. 154(b) by 0 days. days.

(21) Appl. No.: 13/538,872

(22) Filed: Jun. 29, 2012

(65) Prior Publication Data

US 2014/0006281 A1 Jan. 2, 2014

(51) Int. Cl.
*G06Q 20/40* (2012.01)
*G06Q 20/18* (2012.01)
*G06Q 20/20* (2012.01)
*G06Q 20/32* (2012.01)

(52) U.S. Cl.
CPC .......... *G06Q 20/40* (2013.01); *G06Q 20/18* (2013.01); *G06Q 20/20* (2013.01); *G06Q 20/204* (2013.01); *G06Q 20/3274* (2013.01); *G06Q 20/3276* (2013.01); *G06Q 20/3278* (2013.01)

(58) Field of Classification Search
CPC ...... G06Q 20/20; G06Q 20/32; G06Q 20/322; G06Q 20/3276; G06Q 20/40; G06Q 20/02; G06Q 20/4014; G06Q 20/3674; G06Q 20/382; G06Q 20/3821; G06Q 20/401; G06Q 20/40975; G06Q 20/3274; G06Q 30/0238; G06Q 30/0267; G06Q 30/0609; G06Q 30/0613; H04L 9/3273; H04L 9/3263; H04L 63/126; H04L 9/321; G06F 21/31; G06F 3/017; G06F 3/0346; H04W 12/06
See application file for complete search history.

(56) References Cited

U.S. PATENT DOCUMENTS

| 5,774,869 | A | 6/1998 | Toader |
| 6,505,240 | B1 | 1/2003 | Blumenau |
| 6,532,450 | B1 | 3/2003 | Brown et al. |
| 6,708,219 | B1 | 3/2004 | Borella et al. |
| 6,757,255 | B1 | 6/2004 | Aoki et al. |
| 7,512,547 | B2 * | 3/2009 | Ash .............................. 705/16 |
| 7,644,171 | B2 | 1/2010 | Sturniolo et al. |
| 8,255,323 | B1 * | 8/2012 | Casey ............... G06Q 20/3221 705/35 |
| 8,402,153 | B2 | 3/2013 | Friedman |
| 8,990,956 | B2 | 3/2015 | Leber |

(Continued)

OTHER PUBLICATIONS

Final Office Action, dated May 6, 2013, U.S. Appl. No. 13/567,844, filed Aug. 6, 2012.

(Continued)

*Primary Examiner* — Namrata Boveja
*Assistant Examiner* — Carol A See
(74) *Attorney, Agent, or Firm* — Carr & Ferrell LLP

(57) ABSTRACT

Systems and methods for facilitating electronic transactions utilizing data capturing devices are provided herein. Methods may include generating a transaction event which comprises transaction details and receiving a transaction acceptance from a first client device. The transaction acceptance may include a capture of at least a portion of the transaction details and a unique merchant identifier by a first data capturing device of the first client device and a confirmation. The method further includes providing indication of a payment authorization to the merchant.

17 Claims, 4 Drawing Sheets

(56) References Cited

U.S. PATENT DOCUMENTS

| | | |
|---|---|---|
| 2002/0012320 A1 | 1/2002 | Ogier et al. |
| 2003/0135461 A1 | 7/2003 | Brown et al. |
| 2003/0233455 A1 | 12/2003 | Leber et al. |
| 2004/0133463 A1 | 7/2004 | Benderev |
| 2005/0055319 A1 | 3/2005 | Monsen et al. |
| 2005/0071219 A1 | 3/2005 | Kahlert et al. |
| 2005/0273438 A1 | 12/2005 | Yen et al. |
| 2006/0224509 A1 | 10/2006 | Walker et al. |
| 2006/0256716 A1 | 11/2006 | Caci |
| 2007/0104099 A1 | 5/2007 | Mutnuru et al. |
| 2007/0162746 A1 | 7/2007 | Kwon et al. |
| 2007/0199043 A1 | 8/2007 | Morris |
| 2008/0109278 A1 | 5/2008 | Rao |
| 2008/0162315 A1 | 7/2008 | Rampell et al. |
| 2008/0162350 A1 | 7/2008 | Allen-Rouman et al. |
| 2008/0304482 A1 | 12/2008 | Grassi et al. |
| 2009/0016253 A1 | 1/2009 | Lewis et al. |
| 2009/0037277 A1 | 2/2009 | Zuckerberg et al. |
| 2009/0190586 A1 | 7/2009 | Kim |
| 2009/0199070 A1 | 8/2009 | Haymes et al. |
| 2009/0248800 A1 | 10/2009 | Chu et al. |
| 2009/0254984 A1 | 10/2009 | Nice et al. |
| 2010/0077095 A1 | 3/2010 | Wong et al. |
| 2010/0312702 A1 | 12/2010 | Bullock |
| 2011/0022711 A1 | 1/2011 | Cohn |
| 2011/0023105 A1 | 1/2011 | Islam et al. |
| 2011/0154319 A1 | 6/2011 | Carter-Schwendler et al. |
| 2011/0206043 A1 | 8/2011 | Williams |
| 2011/0302408 A1 | 12/2011 | McDermott et al. |
| 2012/0089471 A1* | 4/2012 | Comparelli ............ G06Q 20/20 705/18 |
| 2012/0140018 A1 | 6/2012 | Pikin et al. |
| 2012/0203697 A1* | 8/2012 | Morgan et al. .................. 705/44 |
| 2012/0203701 A1* | 8/2012 | Ayuso de Paul ..... H04L 63/061 705/71 |
| 2012/0209749 A1* | 8/2012 | Hammad ............... G06Q 30/06 705/27.1 |
| 2012/0215690 A1* | 8/2012 | Grinberg ............ G06Q 20/3223 705/42 |
| 2012/0259988 A1 | 10/2012 | Erringer |
| 2012/0290415 A1* | 11/2012 | Itwaru ............................. 705/16 |
| 2013/0024255 A1 | 1/2013 | Mittereder et al. |
| 2013/0080618 A1 | 3/2013 | Balwani |
| 2013/0111002 A1 | 5/2013 | Leber |
| 2013/0124412 A1* | 5/2013 | Itwaru .................. G06Q 20/322 705/44 |
| 2013/0218768 A1 | 8/2013 | Leber |
| 2014/0041015 A1 | 2/2014 | Leber |

OTHER PUBLICATIONS

Non-Final Office Action, dated Mar. 2, 2015, U.S. Appl. No. 13/401,748, filed Feb. 21, 2012.
Final Office Action, dated Jul. 9, 2013, U.S. Appl. No. 13/401,748, filed Feb. 21, 2012.
Advisory Action, dated Aug. 21, 2013, U.S. Appl. No. 13/567,844, filed Aug. 6, 2012.
Non-Final Office Action, dated Aug. 10, 2014, U.S. Appl. No. 13/286,143, filed Oct. 31, 2011.
Non-Final Office Action, dated Jul. 9, 2014, U.S. Appl. No. 13/401,748, filed Feb. 21, 2012.
Final Office Action, dated Nov. 14, 2014, U.S. Appl. No. 13/401,748, filed Feb. 21, 2012.
Notice of Allowance, dated Nov. 7, 2014, U.S. Appl. No. 13/567,844, filed Aug. 6, 2012.
Advisory Action, dated Sep. 29, 2015, U.S. Appl. No. 13/286,143, filed Oct. 31, 2011.
Final Office Action, dated Jun. 4, 2015, U.S. Appl. No. 13/286,143, filed Oct. 31, 2011.
Final Office Action, dated Jul. 8, 2015, U.S. Appl. No. 13/401,748, filed Feb. 21, 2012.
Non-Final Office Action, dated Jan. 28, 2014, U.S. Appl. No. 13/401,748, filed Feb. 21, 2012.
Final Office Action, dated Nov. 13, 2012, U.S. Appl. No. 13/401,748, filed Feb. 21, 2012.
Non-Final Office Action, dated Sep. 2, 2016, U.S. Appl. No. 13/286,143, filed Oct. 31, 2011.
Final Office Action, dated May 7, 2014, U.S. Appl. No. 13/286,143, filed Oct. 31, 2011.
Non-Final Office Action, dated Jun. 18, 2014, U.S. Appl. No. 13/567,844, filed Aug. 6, 2012.
Non-Final Office Action, dated Jan. 7, 2016, U.S. Appl. No. 13/401,748, filed Feb. 21, 2012.
Final Office Action, dated Jun. 30, 2016, U.S. Appl. No. 13/401,748, filed Feb. 21, 2012.
Final Office Action, dated Aug. 17, 2017, U.S. Appl. No. 13/286,143, filed Oct. 31, 2011.

* cited by examiner

SYSTEMS AND METHODS FOR FACILITATING ELECTRONIC TRANSACTIONS UTILIZING A MOBILE COMPUTING DEVICE

FIELD OF THE TECHNOLOGY

Embodiments of the disclosure relate to the facilitation of electronic transactions utilizing a mobile device. More specifically, but not by way of limitation, the present technology may be utilized to facilitate electronic transactions by providing transaction events to customers. The customers may capture at least a portion of the transaction details of the transaction event with a camera phone (or other data capturing device) and confirm the electronic transaction. Authorization for the electronic transaction may be provided when the capture of the transaction information and the confirmation are accepted by the transaction processor such as a financial institution and/or the merchant.

BACKGROUND OF THE DISCLOSURE

Modern methods for facilitating electronic transactions are limited by legacy payment systems and processes. Modern mobile communications devices such as camera phones are ubiquitous and provide unique mediums for customers and merchants to facilitate electronic transactions. These mobile communications devices employ data capturing devices and software that are capable of interpreting the captured data, even when the data is encrypted or embedded within another medium. For example, data capturing device may be utilized to scan barcodes, read quick response codes, and so forth.

SUMMARY OF THE DISCLOSURE

According to some embodiments, the present technology may be directed to methods for facilitating electronic transactions. The methods may comprise: (a) generating, via a transaction processor, a transaction event which comprises transaction details; (b) receiving, via the transaction processor, a transaction acceptance from a first client device, the transaction acceptance comprising: (i) a capture of at least a portion of the transaction details and a unique merchant identifier by a first data capturing device of the first client device; and (ii) a confirmation; and (c) providing indication of a payment authorization to the merchant.

According to additional embodiments, the present technology may be directed to systems facilitating at least a portion of a secure electronic financial transaction. The systems may comprise: (a) a memory for storing executable instructions; (b) a processor for executing the instructions stored in memory; (c) a transaction broker module stored in memory and executable by the processor to: (i) generate a transaction event, the transaction event comprising transaction details; and (ii) receive a transaction acceptance from a second client device, the transaction acceptance comprising: (1) a capture of at least a portion of the transaction details and a unique merchant identifier captured by a first data capturing device of a first client device; and (2) a confirmation; and (d) a transaction authorization module stored in memory and executable by the processor to: (i) generate a transaction authorization for the transaction event based upon the transaction details, unique merchant identifier, and the transaction acceptance; and (ii) provide indication of a payment authorization to the first client device.

According to other embodiments, the present technology may be directed to non-transitory computer readable storage media having a program embodied thereon, the program being executable by a processor to perform a method for facilitating an electronic transaction. The method may comprise: (a) generating, via a transaction processor, a transaction event which comprises transaction details; (b) receiving, via the transaction processor, a transaction acceptance from a first client device, the transaction acceptance comprising: (i) a capture of at least a portion of the transaction details and a unique merchant identifier by a first data capturing device of the first client device; and (ii) a confirmation; and (c) providing indication of a payment authorization to the merchant.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
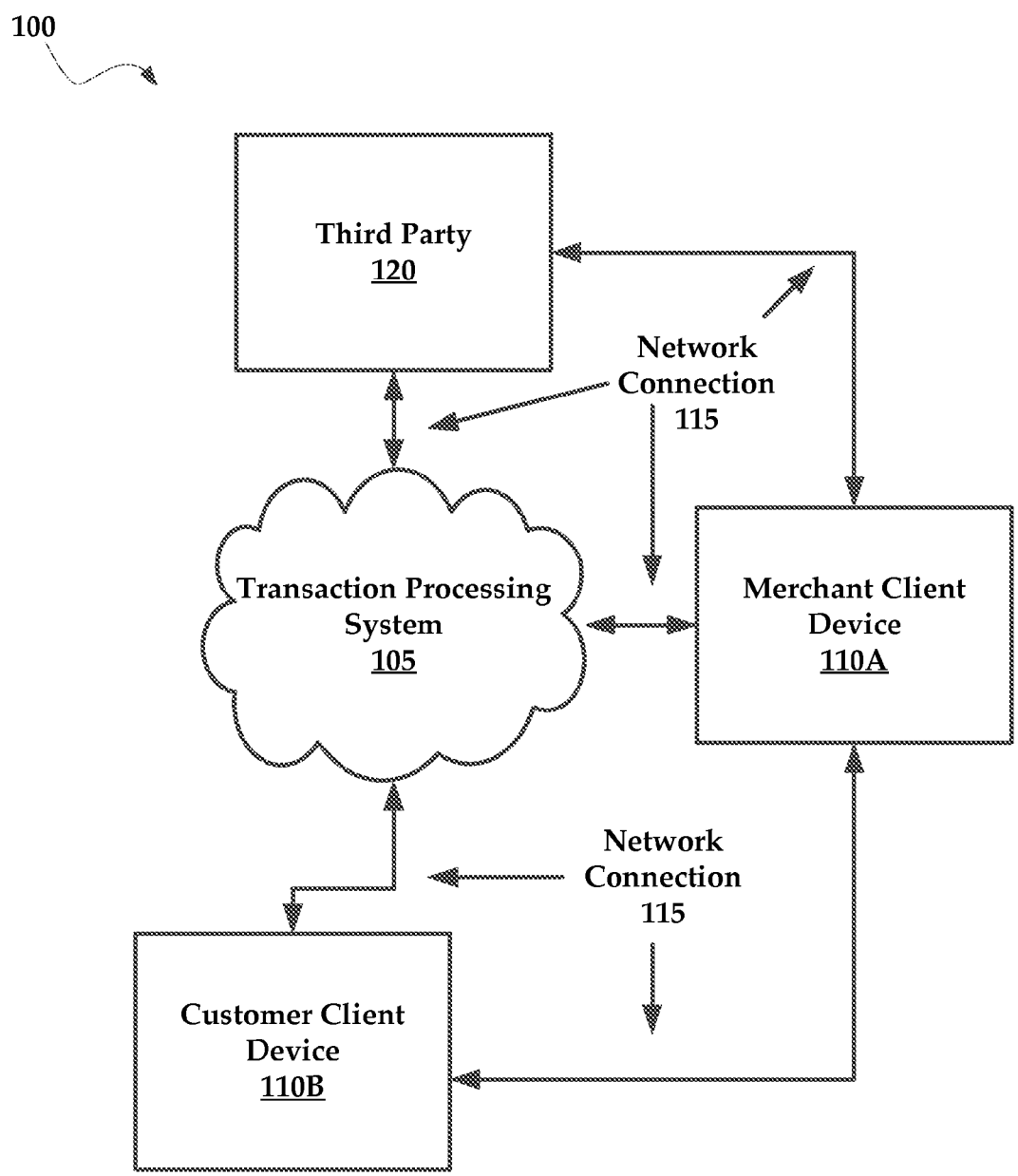
FIG. 1 illustrates an exemplary system for practicing aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally described, the present technology may be directed to systems, methods, and media that facilitate electronic transactions utilizing a mobile device. Exemplary electronics transactions may include, but are not limited to, electronic transactions between a merchant and one or more customers.

In accordance with the present disclosure, the present technology may utilize data capturing and data interpreting features of a computing device such as a mobile telephone to initiate a transaction and/or accept the terms of a transaction. The mobile device may capture data by way of Bluetooth, WiFi, image capturing, Infra Red, Near Field, and active or passive radio frequency identification ("RFID") devices and protocols.

The term "capture" may be understood to include not only the capture of an image file but also a scan, a view, a sensing, a reading, or other similar actions for gathering information by way of a mobile device or peripheral/integrated data capturing devices associated therewith.

Exemplary transaction details may be specified by the merchant and may comprise transaction terms (e.g., price, parties, quantities, time, indemnity, warranties, and so forth), suitable methods for acceptance of the transaction by the customer, and so forth.

Customers may initiate transaction by capturing a unique merchant identifier ("UMI") and/or transaction details from a variety of media. The details of a transaction may be stored in a physical or digital object such as printed text or symbols, a transactional document (e.g., contract, bill, receipt, invoice, a price tag, letter, etc.), a barcode, a uniform resource locator ("URL"), an Internet Protocol ("IP") address, a quick response ("QR") code, a watermark, a video file, an audio file, an image, along with any other medium in which scanable information may be embedded. The transaction details may be encoded into the physical or digital object.

The customer may accept/confirm the transaction by providing acceptable input via their mobile device. In some instances, acceptance may include a digital signature or motion-based input. The motion-based input may be captured by a sensing device associated with the merchant device. It is noteworthy that the merchant may establish the type of input that constitutes proper acceptance of the transaction. Thus, the type of input used by the customer to accept the terms of the transaction may be specified by the transaction details that were provided to the customer upon initiation of the transaction.

Broadly speaking, the present technology may facilitate device-to-device electronic transactions between merchants and customers by way of transactional applications or modules that execute on the devices. In other instances, a transaction processing system may facilitate the electronic transactions, acting as a processing proxy for the merchant and the customer. The transaction processing system may also communicate with a financial processing system to ensure that payment authorizations are provided to appropriate financial processors. The transaction processing system may also shield the merchant from PCI requirements because the merchant may never handle the sensitive account information of the customer, such as a credit card number.

These and other advantages of the present technology will be described in greater detail with reference to the collective FIGS. 1-4.

FIG. 1 illustrates an exemplary system 100 for practicing aspects of the present technology. The system 100 may include a transaction processing system, hereinafter "system 105" that may be implemented in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the system 105 may include a distributed group of computing devices such as web servers that do not share computing resources or workload. Additionally, the system 105 may include a single computing device that has been provisioned with a plurality of programs that each produces instances of event data.

Merchants and customers may communicate transaction data (e.g., digital instruments) between one another and/or system 105 via individual client devices such as merchant client device 110A and customer client device 110B. It is noteworthy to mention that the client devices 110A and 110B may alternatively be referred to as the first and second client devices, the order of which depends upon the transaction. That is, the merchant may be associated with either the first client device or the second client device, depending upon the transaction. Therefore, the customer may be associated with the other client device.

The transaction processing system 105 may communicatively couple with the merchant client device 110A and customer client device 110B via a network connection 115. The network connection 115 may include any one of a number of private and public communications mediums such as the Internet. In some embodiments, the merchant client device 110A and the customer client device 110B may utilize PGP, SSL, or another suitable cryptographic protocol for transmitting transaction information between each other and/or the transaction processing system 105.

In some embodiments, merchant client device 110A and customer client device 110B may communicate with the system 105 using a secure application programming interface or API. An API allows various types of programs to communicate with one another in a language (e.g., code) dependent or language agnostic manner.

Additionally, each of the merchant client device 110A and the customer client device 110B may comprise at least one data capturing device. Examples of data capturing devices include, but are not limited to, a barcode scanner, an Infrared receiver, a Bluetooth receiver, a WiFi receiver, an image capturing device (e.g., camera), and other suitable devices that capture data of any type. It will be understood that the image capturing device may not only include the hardware that is utilized to capture scans/images of objects, but also software that may be utilized in conjunction with the hardware to interpret the captured data. For example, when an image of a page of a document is captured, the client device may utilize optical character recognition (OCR) functionalities to detect, extract, or otherwise determine information included in the image. Therefore, if an image of an invoice is captured, the client device may employ OCR functions to determine relevant transaction details from the captured data such as a product description, a product price, a billing address, a merchant name, or other types of information.

The system 105 may also communicate with a third party 120 such as a financial institution (e.g. bank, credit card processor, etc.) that may provide monetary funds to a merchant, often using the merchant's account associated with the merchant's financial institution of choice. The system 105 and the financial institution 120 may also communicate via the network connection 115, which may comprise any one of a number of secure/insecure communications protocols.

The system 105 may be generally described as a system for facilitating an electronic transaction between a merchant and a customer utilizing a mobile device. It is noteworthy that the system 105 may facilitate at least a portion of a financial transaction as the system 105 may in some instances authorize a payment associated with an electronic transaction, whereas in other instances the system 105 may also transmit payment to the merchant as well (e.g., when the transaction processing system is a bank).

Figure 2:
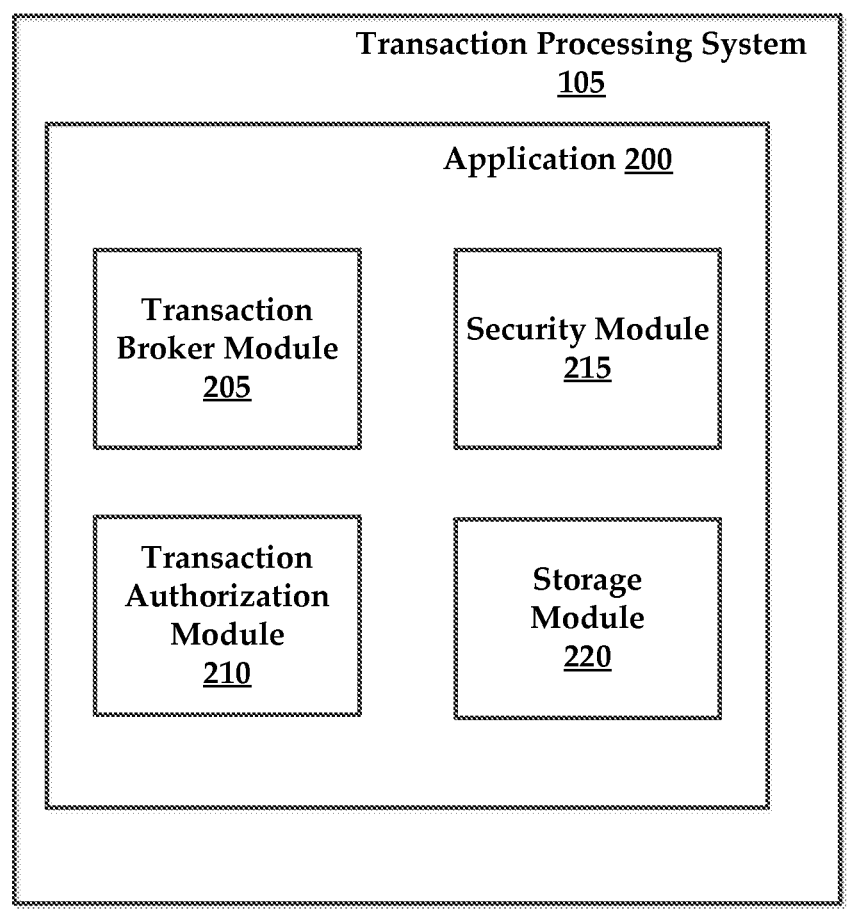
FIG. 2 illustrates an exemplary conversion application for facilitating electronic transactions.

Referring now to FIG. 2, the system 105 may generally comprise memory that includes executable instructions and a processor that executes the instructions stored in memory. Further details regarding exemplary memory and processor for the transaction processing system 105 are described relative to computing device 400 described relative to FIG. 4.

According to some embodiments, the executable instructions may be embodied as an application 200 that allows the system 105 to facilitate electronic transactions between merchants and customers. The application 200 may generally comprise a transaction broker module 205, a transaction authorization module 210, a security module 215, and a storage module 220. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules/engines/generators of the application 200 may include separately configured web servers.

In accordance with the present disclosure, the application 200 may be installed and executed on individual client devices, such as client devices 110A and 110B. Moreover, because the client devices may communicate directly with one another, the client devices may not require the system 105 to facilitate each step of the electronic transaction.

Generally speaking, a transaction event may be initiated by either the merchant or the customer. When the merchant initiates the transaction event, the merchant may provide transaction details to the system 105. Transaction details may include details such as a product description, price, quantity available, time, or other commercial terms that govern the sale of a product or service to a customer. Additionally, the transaction details may specify one or more suitable methods for acceptance by the customer. For example, the transaction details may specify that the customer is to digitally sign a purchase order. In other instances, the transaction details may specify that the customer client device 110B supply a motion-based input that is captured by the merchant client device 110A. In other embodiments, the transaction details may specify the exchange of public and private keys between the merchant and customer client devices. The exchange of public and private key information may occur via near field sensor communication, Bluetooth, WiFi, Infrared, RFID, or other communications protocols.

Additionally, the merchant may provide their unique merchant identifier ("UMI") along with the transaction details. In some instances, the UMI may take the form of a public/private encryption keys. In other embodiments, the UMI may include a token or other uniquely generated identifier that is specific to the merchant. The UMI may be generated for the merchant by the security module 215. In some instances the customer may also have a unique customer identifier ("UCI"). Transactions may be facilitated by the mutual exchange of UMI and UCI via the system 105 or via device-to-device communications.

In accordance with the present disclosure, the UMI may be associated with the merchant client device 110A. For example, a merchant UMI may be associated with a kiosk that sells a product. The UMI may be displayed on a display device associated with the merchant client device 110A. In other embodiments, the UMI may be stored in a format that is accessible via near field, RFID, or other proximity based device-to-device communications.

In some embodiments, the customer may initiate a transaction event by capturing (e.g., sensing, detecting, scanning, etc.) the UMI of the merchant with their customer client device 110B. For example, the customer may utilize the image capturing device (e.g., camera) of their customer client device 110B to scan a QR code displayed on the display device of the merchant client device 110A. In other examples, the customer client device 110B may scan a barcode, capture an image of the serial number of the merchant client device 110A, or other similar function for initiating an electronic transaction with a merchant client device 110A. Advantageously, the UMI may not only be associated with a merchant, but also with a specific merchant client device. Therefore, a merchant who operates a plurality of merchant client devices may have unique UMI for each device. Electronic transactions may be facilitated between the devices and customer's mobile devices using the unique UMI for the device.

Using the UMI, the merchant may associate product or services for sale with the UMI for a specific device. In instances where the device provides a product, an up-to-date inventory for the device may be maintained to aid the facilitation of electronic transactions, as will be discussed in greater detail below.

Upon obtaining the UMI, the customer client device 110B may provide the same to the system 105. That is, the transaction broker module 205 may be executed to receive the UMI. Because the UMI may be associated with a particular merchant client device 110A, the transaction broker module 205 may provide the customer client device 110B with selections of available transactions for that particular merchant client device 110A. The transaction broker module 205 may receive one or more selections back from the customer client device 110B.

Next, the transaction broker module 205 may transmit transaction details to the customer client device 110B. Using their customer client device 110B, the customer may confirm or deny the transaction. In some instances, the customer may be permitted to modify one or more portions of the transaction details. Consequently, the modifications may be subject to merchant approval before the transaction may be completed.

Again, the customer may accept the transaction by providing an acceptance as specified in the transaction details. For example, the transaction details may require that the customer provide a digital signature to confirm the transaction. Additionally, the confirmation may include a payment method such as a credit card number, a checking account number, or other suitable payment mechanism.

Once the customer has input their confirmation, the captured UMI and confirmation are transmitted to the transaction authorization module 210. The combination of the transaction details and the confirmation are referred to as a transaction acceptance. The transaction authorization module 210 may be executed to compare the transaction details (e.g., offer) with the confirmation (e.g., acceptance) to authorize the electronic transaction. Additionally, the transaction authorization module 210 may verify the UMI captured by the customer client device 110B. Such verification measures are important in instances where the merchant initiates the electronic transaction, because the capture of the UMI may not be the initiating action. For example, the merchant may embed their UMI in a universal product code ("UPC") label that is printed on a price tag. The UPC may also include the transaction details such as price and product number.

Additionally, the transaction authorization module 210 may transmit the payment method and amount to the proper financial institution. If the transaction amount is approved by the financial institution, the transaction authorization module 210 may transmit an authorization signal to the merchant client device 110A. The merchant client device 110A may then provide the purchased product or service to the customer knowing that payment has been authorized by the customer's financial institution.

Advantageously, the transaction details and the UMI may be incorporated within a variety of physical and/or digital objects. Exemplary objects may comprise a barcode, a price tag, a universal product code, a quick response code, a watermark, a capture, a video file, an audio file, an Internet protocol address, a uniform resource locator, or combinations thereof.

In some instances the security module 215 may transmit the transaction details and/or transaction acceptance using, for example, a public-private key schema. In instances where the transaction details have been secured, the security module 215 may provide the merchant's key to decode the transaction data for the customer client device 110B. The exchange of the merchant's key may be predicated upon the customer client device 110B capturing and transmitting the UMI of the merchant to the system 105.

It will be understood that in some embodiments, the security module 215 may encode transaction details into a secure digital object that is displayable upon a display device of the merchant client device 110A. The security module 215 may encode the transaction details in such a way that the secure digital object is recognizable by a data capturing device of the customer client device 110B. For example, the customer client device 110B may include instructions that enable the customer client device 110B to decode the secure digital object. Again, the encryption/decryption and/or encoding/decoding schema utilized with the transaction details may be exchanged via capturing the UMI by the customer client device 110B, the capturing of a UCI by the merchant client device 110A, or both.

Stated otherwise, merchant and customer client devices may capture each other's UMI or UCI. These unique identifiers may be utilized in a handshake process to verify the authenticity or identity of the transacting parties. Once identification has been verified, secure information such as public-private keys or sensitive information such as transaction details may be exchanged between the devices.

The security module 215 may also encrypt the payment method for the customer to reduce the likelihood that the payment method could be exposed during transmission of the same to the financial institution. Moreover, because the system 105 may act as an agent that receives the payment method, the merchant may be shielded from PCI compliance requirements because it may never receive the customer's account information.

Additionally, data generated by the transaction broker module 205, such as the transaction details and the UMI, along with data generated by the transaction authorization module 210, such as transaction acceptances and transaction authorizations may be stored in storage media that is selectively and communicatively couplable with the system 105.

In instances of device-to-device transaction processing, transaction acceptances received from customer client device 110B may be stored by the merchant client device 110A for later processing. For example, the merchant client device 110A may transmit data to the system 105 asynchronously, such as when the device 110A is unable to couple with the system 105. The merchant client device 110A may aggregate transaction acceptances received from customer client devices 110B. Upon establishing a communicative coupling with the system 105, the merchant client device 110A may then transmit the transaction acceptances. The transaction authorization module 210 may then process the transactions for authorization. Additionally, the storage module 220 may store transaction authorizations in a storage media for later retrieval by the merchant.

An exemplary use case for the present technology includes the merchant client device 110A as a point of sale ("POS") terminal. The display of POS may display a QR code that includes transaction details and a UMI for the store. The UMI may also be linked to the sales associate. The customer may capture the QR code by scanning the same with an image capturing device associated with their cellular telephone (e.g., customer client device). The transaction details may specify that a digital signature is required and prompt the customer for a transaction amount. Upon receiving a payment method and a digital signature, the transaction acceptance may be provided to the system for authorization. Once the transaction processing system has received payment authorization, the transaction processing system may transmit the payment authorization to the merchant thereby allowing the customer to receive their product or service.

In other embodiments, the merchant and customer devices both include cellular telephones that have image capturing devices and software. To initiate a transaction, the cellular telephone may scan QR codes displayed on the display screens of each telephone. This scanning results in the verification of UMI and UCI via the transaction processing system. A list of available products for sale by the merchant (transaction details) may be transmitted to the customer. The customer may then select one or more products for purchase. The transaction and payment authorization steps are executed as described above. Again, rather than utilizing a transaction processing system, each of the devices may be provisioned with an application that facilitates electronic transactions such that the customer's cellular telephone receives the transaction details from the merchant device and provides the transaction details and payment method to a financial institution. The financial institution may then provide authorization for the transaction to the merchant and the customer, while the merchant maintains an arms-length distance from the customer's sensitive account information.

Figure 3:
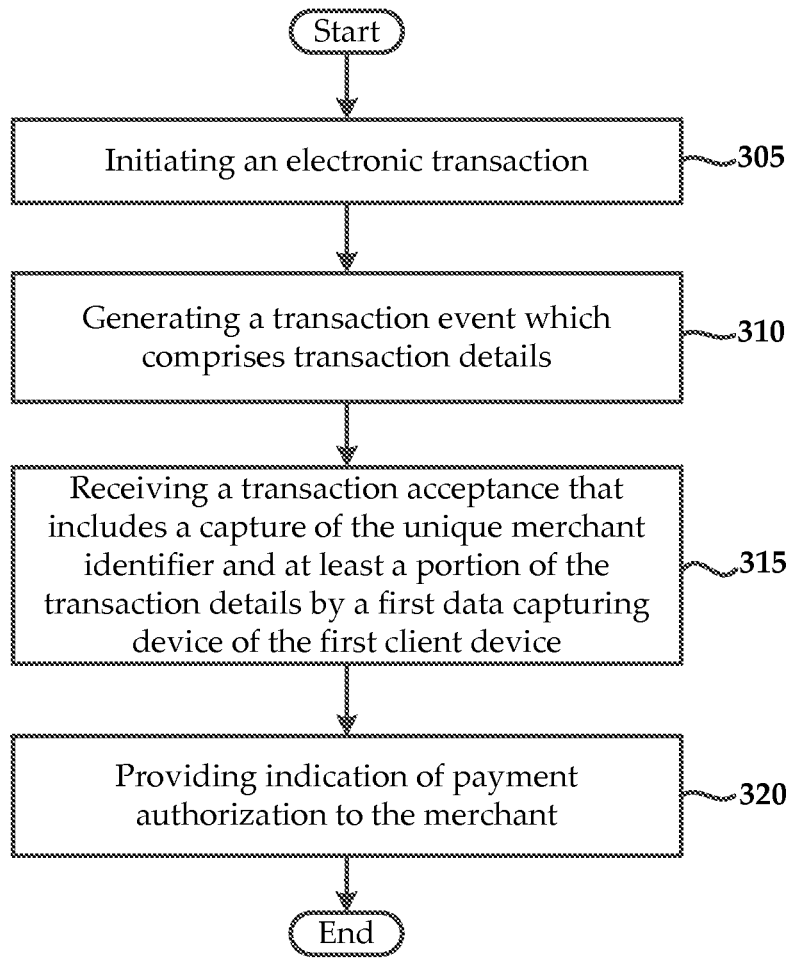
FIG. 3 is a flowchart of an exemplary method for facilitating electronic transactions.

FIG. 3 illustrates a flowchart of an exemplary method for facilitating an electronic transaction. The method may comprise a step 305 of initiating an electronic transaction. As mentioned above, the initiation of the electronic transaction may occur when a customer client device captures the UMI of a merchant, or there is a mutual exchange of UMI and UCI between a customer and a merchant.

The method may also include a step 310 of generating a transaction event which comprises transaction details. According to some embodiments, the transaction details may comprise information such as transaction amount, product description, product quantities, and so forth.

The method may comprise a step 315 of receiving a transaction acceptance from a first client device. According to some embodiments, the transaction acceptance includes a capture of the unique merchant identifier and at least a portion of the transaction details by a first data capturing device of the first client device. Additionally, the transaction acceptance may include a confirmation such as a digital signature, along with a payment method such as a credit card number or checking account/routing number.

In some embodiments, the method may also include a step 320 of providing indication of payment authorization to the merchant. It is noteworthy that the payment authorization may be generated by a financial institution that determines if the payment method provided by the customer is authorized to transact for the amount specified in the transaction details (e.g., does the customer have enough funds to pay for the transaction amount).

It is noteworthy that the method may include fewer or more steps that those recited above.

Figure 4:
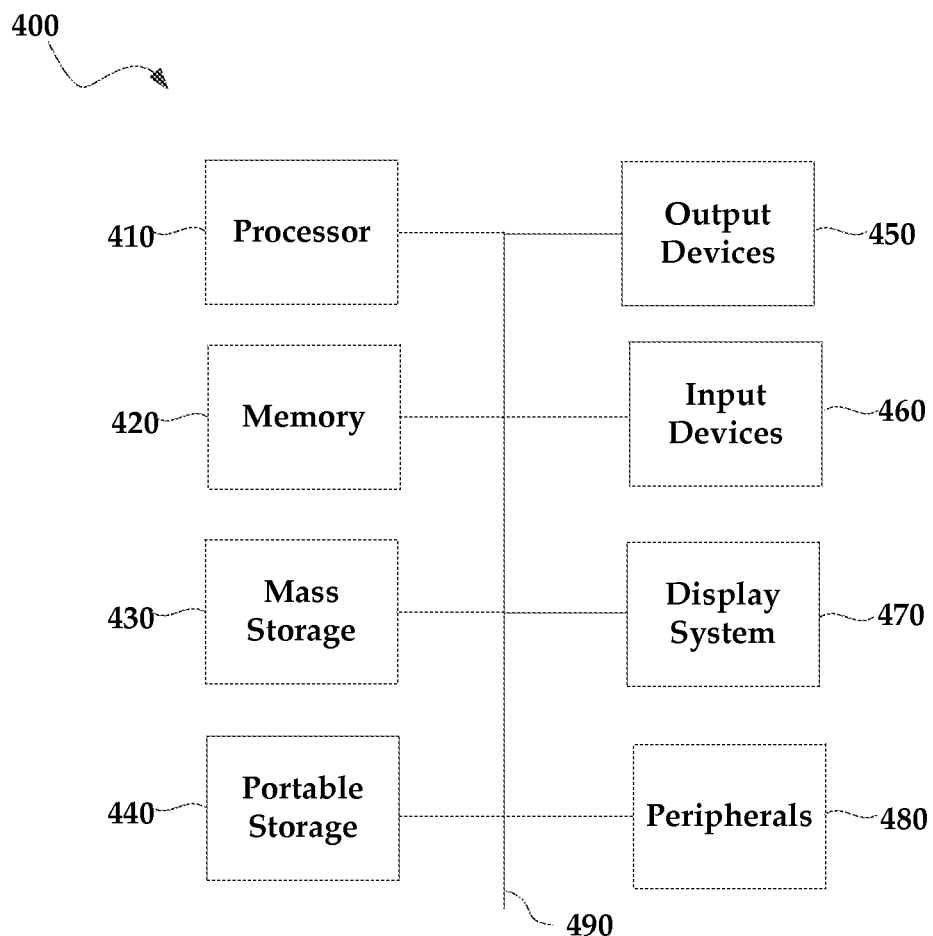
FIG. 4 illustrates an exemplary computing device that may be used to implement embodiments according to the present technology.

FIG. 4 illustrates an exemplary computing device 400 (also referred to herein as system 400 and/or computing system 400) that may be used to implement the various embodiments of the present technology. The computing device 400 of FIG. 4 includes one or more processors 410 and memory 420. Main a memory store 420 stores, in part, instructions and data for execution by processor 410. Main a memory store 420 can store the executable code when the system 400 is in operation. The system 400 of FIG. 4 may further include a mass storage device 430, portable storage medium drive(s) 440, output devices 450, user input devices 460, a graphics display 470, and other peripheral devices 480.

The components shown in FIG. 4 are depicted as being connected via a single bus 490. The components may be connected through one or more data transport means. Processor unit 410 and main a memory store 420 may be connected via a local microprocessor bus, and the mass storage device 430, peripheral device(s) 480, portable storage device 440, and graphics display 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main a memory store 410.

Portable storage device 440 operates in conjunction with a portable non-volatile storage medium, such as a floppy disk, compact disk or digital video disc, to input and output data and code to and from the computing device 400 of FIG. 4. The system software for implementing embodiments of the present technology may be stored on such a portable medium and input to the computing device 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing device. Peripheral device(s) 480 may include a modem or a router.

The components contained in the computing device 400 of FIG. 4 are those typically found in computing devices that may be suitable for use with embodiments of the present technology and are intended to represent a broad category of such computer components that are well known in the art. Thus, the computing device 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for facilitating an electronic transaction using a transaction processor that comprises a processor and a memory for storing executable instructions that are executed by the processor to perform the method comprising:
    receiving from a customer client device a capture of a unique merchant identifier by a first data capturing device of the customer client device;
    receiving from a merchant client device a capture of a unique customer identifier associated with the customer client device;
    authenticating the customer client device and the merchant client device from the unique merchant identifier and the unique customer identifier;
    generating a transaction event comprising transaction details;
    receiving a transaction acceptance from the customer client device, the transaction acceptance comprising:
        a capture of at least a portion of the transaction details and the unique merchant identifier by the first data capturing device of the customer client device; and
        a confirmation that comprises motion-based input performed by the customer client device and captured by a second data capturing device of the merchant client device associated with the merchant;
    providing indication of a payment authorization to the merchant; and
    generating a secure digital object, the secure digital object comprising at least a portion of the transaction details, the unique merchant identifier, or combinations thereof, wherein the transaction event is stored within the secure digital object.

2. The method according to claim 1, wherein the transaction details are embedded within at least one or more of a barcode, a universal product code, a quick response code, a watermark, a capture, a video file, an audio file, an Internet protocol address, a uniform resource locator, or combinations thereof.

3. The method according to claim 1, further comprising:
    encoding the transaction details and the unique merchant identifier into the secure digital object that is displayable upon a display device in such a way that the secure digital object is recognizable by the first data capturing device of the customer client device; and
    decoding the secure digital object by the customer client device.

4. The method according to claim 3, wherein the confirmation comprises a digital signature.

5. The method according to claim 1, further comprising authorizing the transaction event based upon the transaction details and the transaction acceptance by providing the transaction details and the transaction acceptance to a financial institution.

6. The method according to claim 1, wherein the first data capturing device comprises an image capturing device.

7. The method according to claim 1, wherein the unique merchant identifier is associated with a specific merchant client device.

8. The method according to claim 7, wherein specific transaction details are associated with the unique merchant identifier for the specific merchant client device.

9. A system for facilitating an electronic transaction, the system comprising:
    a memory for storing executable instructions;
    a processor for executing the instructions;
    a transaction broker module stored in memory and executable by the processor to:
        receive from a customer client device a capture of a unique merchant identifier by a first data capturing device of the customer client device, the unique merchant identifier comprising a public/private key pair;
        receive from a merchant client device a unique customer identifier associated with the customer client device and captured from communication with the customer client device, wherein the capture is an image of the unique customer identifier;
        authenticate both the customer client device and the merchant client device from the unique merchant identifier and the unique customer identifier;
        generate a transaction event, the transaction event comprising transaction details; and
        receive a transaction acceptance from the customer client device, the transaction acceptance comprising:
            a capture of at least a portion of the transaction details and the unique merchant identifier captured by the first data capturing device of the customer client device; and
            a confirmation that comprises motion-based input performed by the customer client device and captured by a second data capturing device of the merchant client device associated with the merchant;
    a transaction authorization module stored in memory and executable by the processor to:
        generate a transaction authorization for the transaction event based upon the transaction details, the unique merchant identifier, and the transaction acceptance; and
        provide indication of a payment authorization to the customer client device; and
    a security module stored in memory and executable by the processor to generate a secure digital object for the transaction details, the secure digital object comprising at least a portion of the transaction details, the unique merchant identifier, or combinations thereof, wherein the transaction event is stored within the secure digital object.

10. The system according to claim 9, wherein the transaction authorization module further provides indication of the transaction authorization to a merchant client device associated with the merchant.

11. The system according to claim 9, wherein the security module further encodes the transaction details into the secure digital object that is displayable upon a display device in such a way that the secure digital object is recognizable by the first data capturing device of the customer client device, wherein the customer client device is adapted to decode the secure digital object.

12. The system according to claim 11, wherein secure digital object is selected from the group consisting of a barcode, a universal product code, a quick response code, a watermark, a capture, a video file, an audio file, an Internet protocol address, a uniform resource locator, and combinations thereof.

13. The system according to claim 9, wherein the confirmation further comprises a digital signature and a payment method received from the customer client device.

14. The system according to claim 13, wherein the digital signature comprises motion-based input performed by the customer client device and captured by the second data capturing device of the merchant client device associated with the merchant.

15. The system according to claim 9, wherein the first data capturing device comprises an image capturing device and the capture includes an image of the transaction details.

16. The system according to claim 9, further comprising a storage module that stores at least one or more of the transaction event, the transaction details, the unique merchant identifier, the transaction acceptance, or combinations thereof in a storage media that is selectively and communicatively coupled with the system.

17. A non-transitory computer readable storage media having a program embodied thereon, the program being executable by a processor to perform a method for facilitating an electronic transaction, the method comprising:
- receiving from a customer client device a capture of a unique merchant identifier by a first data capturing device of the customer client device, the capture being an image of the unique merchant identifier and the unique merchant identifier is embedded in a scannable universal product code or quick response code;
- receiving from a merchant client device a unique customer identifier associated with the customer client device and captured from communication with the customer client device, wherein the capture is an image of the unique customer identifier;
- authenticating the customer client device and the merchant client device from the unique merchant identifier and the unique customer identifier;
- generating a transaction event comprising transaction details;
- receiving a transaction acceptance from the customer client device, the transaction acceptance comprising:
  - a capture of at least a portion of the transaction details and the unique merchant identifier by the first data capturing device of the customer client device; and
  - a confirmation that comprises motion-based input performed by the customer client device and captured by a second data capturing device of the merchant client device associated with the merchant;
- providing indication of a payment authorization to the merchant; and
- generating a secure digital object, the secure digital object comprising at least a portion of the transaction details, the unique merchant identifier, or combinations thereof, wherein the transaction event is stored within the secure digital object.

* * * * *